US010781987B2

(12) United States Patent
Zozgornik et al.

(10) Patent No.: US 10,781,987 B2
(45) Date of Patent: Sep. 22, 2020

(54) LIGHT CONVERTING DEVICE

(71) Applicant: Lumileds LLC, San Jose, CA (US)

(72) Inventors: Steffen Zozgornik, Aachen (DE); Ulrich Hechtfischer, Aachen (DE)

(73) Assignee: LUMILEDS LLC, San Jose, CA (US)

(*) Notice: Subject to any disclaimer, the term of this patent is extended or adjusted under 35 U.S.C. 154(b) by 0 days.

(21) Appl. No.: 16/469,111

(22) PCT Filed: Dec. 7, 2017

(86) PCT No.: PCT/EP2017/081910
§ 371 (c)(1),
(2) Date: Jun. 12, 2019

(87) PCT Pub. No.: WO2018/108709
PCT Pub. Date: Jun. 21, 2018

(65) Prior Publication Data
US 2019/0383456 A1 Dec. 19, 2019

(30) Foreign Application Priority Data
Dec. 14, 2016 (EP) .................................. 16204034

(51) Int. Cl.
F21S 41/176 (2018.01)
F21S 41/30 (2018.01)
(Continued)

(52) U.S. Cl.
CPC ............. F21S 41/176 (2018.01); F21S 41/16 (2018.01); F21S 41/30 (2018.01); F21S 45/47 (2018.01); F21V 7/22 (2013.01)

(58) Field of Classification Search
CPC .. F21S 41/76; F21S 41/30; F21S 41/16; F21S 45/47; F21V 7/02
See application file for complete search history.

(56) References Cited

U.S. PATENT DOCUMENTS

2012/0224384 A1* 9/2012 Takahira ................. F21V 13/14
362/509
2013/0182452 A1* 7/2013 Takahira ................. F21S 41/24
362/510
(Continued)

FOREIGN PATENT DOCUMENTS

EP 2822111 A1 1/2015
EP 2975655 A1 1/2016
(Continued)

OTHER PUBLICATIONS

EPO as ISA, PCT/EP2017/081910 filed Dec. 7, 2017, "International Search Report and Written Opinion" dated Mar. 21, 2018, 14 pages.
(Continued)

Primary Examiner — Anabel Ton

(57) ABSTRACT

The invention describes a light converting device comprising:
  a light converter for converting laser light to converted light, the light converter comprising a light entrance surface, a bonding surface opposite to the light entrance surface and a side surface;
  a substrate carrying the light converter and comprising a reflective structure for reflecting laser light and converted light;
  a reflective side structure optically coupled to the side surface of the light converter and for reflecting laser light and converted light;
  a cooling element attached to the reflective side structure for cooling the reflective side structure, wherein the cooling element comprises material which is transparent in the wavelength range of the laser light and the wavelength range of the converted light, and wherein the cooling element is arranged in an optical path of the laser light, an optical path of reflected laser light and an optical path of the converted light, and
(Continued)

a decoupling structure between the light converter and the cooling element for avoiding light guiding of the reflected laser light and the converted light in the cooling element.

The invention further describes a light emitting element, a laser-based light source comprising such a light converting device or such a light emitting device, and a vehicle headlight comprising one or more laser-based light sources.

13 Claims, 3 Drawing Sheets

(51) Int. Cl.
*F21V 7/22* (2018.01)
*F21S 41/16* (2018.01)
*F21S 45/47* (2018.01)

(56) References Cited

U.S. PATENT DOCUMENTS

| | | | |
|---|---|---|---|
| 2013/0335989 A1* | 12/2013 | Sato | B60Q 1/04 362/510 |
| 2016/0139328 A1* | 5/2016 | Hikmet | F21S 43/14 362/84 |
| 2017/0122516 A1* | 5/2017 | Hager | F21S 41/176 |
| 2018/0372293 A1* | 12/2018 | Hechtfischer | F21V 9/30 |

FOREIGN PATENT DOCUMENTS

| | | | | |
|---|---|---|---|---|
| WO | 2009095662 A1 | | 8/2009 | |
| WO | WO-2009095662 A1 | * | 8/2009 | ........... H01L 33/507 |
| WO | 2015121089 A1 | | 8/2015 | |

OTHER PUBLICATIONS

Extended European Search Report dated Jun. 26, 2017, European Application No. 16204034.9, 10 pages.

* cited by examiner

LIGHT CONVERTING DEVICE

CROSS-REFERENCE TO RELATED APPLICATIONS

The present application is a § 371 application of International Application No. PCT/EP2017/081910 filed on Dec. 7, 2017 and titled "LIGHT CONVERTING DEVICE," which claims the benefit of European Patent Application No. 16204034.9 filed on Dec. 14, 2016. International Application No. PCT/EP2017/081910 and European Patent Application No. 16204034.9 are incorporated herein.

FIELD OF THE INVENTION

The invention relates to a light converting device, a light emitting element, a laser-based light source comprising such a light converting device or such a light emitting device and a vehicle headlight comprising such a laser-based light source.

BACKGROUND OF THE INVENTION

In high luminance light sources often a light converting device is used that is excited by e.g. blue light emitted by a laser. A phosphor of the light converting device is coupled to a heatsink by means of a layer of glue or solder which is provided between the heatsink and the phosphor. The high intensity especially of blue laser light and the high temperature caused by the light conversion by means of the phosphor may cause reliability issues.

WO2015121089A1, EP2822111A1, US20130335989A1 and WO2009095662A1 proposed specific cooling structures for the phosphor.

SUMMARY OF THE INVENTION

It is an object of the present invention to provide an improved light converting device. The invention is defined by the independent claims. The dependent claims define advantageous embodiments.

According to a first aspect a light converting device is provided. The light converting device comprises a light converter. The light converter is adapted to convert laser light to converted light. A peak emission wavelength of the converted light is in a longer wavelength range than a laser peak emission wavelength of the laser light. The light converter comprises a light entrance surface, a bonding surface opposite to the light entrance surface and a side surface. The light converting device further comprises a substrate comprising a reflective structure. The light converter is arranged on the substrate such that laser light and converted light can be reflected by means of the reflective structure. The light converting device further comprises a reflective side structure which is optically coupled to the side surface of the light converter. The reflective side structure is arranged to reflect laser light and converted light. The light converting device further comprises a cooling element attached to the reflective side structure for cooling the reflective side structure. The cooling element comprises a material which is transparent in the wavelength range of the laser light and the wavelength range of the converted light. The cooling element is arranged in an optical path of the laser light, an optical path of the reflected laser light and an optical path of the converted light. The cooling element is attached to the reflective side structure such that light guiding of laser light and converted light in the cooling element is avoided.

The, for example, blue laser light and the converted light are preferably diffusely reflected by means of the reflective structure or a combination of the reflective structure and corresponding scattering elements within, for example, the light converter. A part of the reflected light may hit the reflective side structure. A part of the light hitting the reflective side structure may be absorbed and may cause unwanted local heating of the reflective side structure. This local heating may damage the reflective side structure such that especially back reflection of the blue laser light in the light converter may be reduced. This may influence the intensity and/or color point of the light which can be emitted by means of the light converting device. The cooling element is in thermal contact with the reflective side structure and has preferably a thermal conductance of more than 10 W/K, more preferably of more than 20 W/K and most preferably of more than 30 W/K. The size and shape of the cooling element has to be adapted to the amount of heat generated at the reflective side structure. Sapphire has a thermal conductance of around 40 W/K (thermal conductivity of around 40 W/(mK)). The cooling element may therefore remove or dissipate a substantial part of the heat generated in or at the reflective side structure such that damage of the reflective side structure is reduced. Aging of materials comprised by the reflective side structure may, thus, be delayed. The light converter may, for example, be a thin (e.g. 50 µm) rectangular or circular plate. The thin sides of the light converter may be covered with the reflective side structure.

The light converting device comprises a decoupling structure. The decoupling structure is arranged between the light converter and the cooling element. The decoupling structure is arranged to avoid light guiding of the reflected laser light and the converted light in the cooling element. A refractive index of the decoupling structure may be the same or less than a refractive index of the material at a surface of the cooling element opposite a surface of the cooling element facing the light converter. Light guiding may, for example, be avoided by reducing or even avoiding a direct interface between the cooling element and the light converter. The cooling element and the light converter may be arranged such that only a minor part of the facing surfaces touch each other. Surface roughness of the surface of the light converter and/or the surface of the cooling element may, for example, be arranged such that less than 5%, preferably less than 3% and most preferably less than 1% of the surfaces of the light converter and the cooling element superimposed upon each other touch each other. There may be an air gap between the cooling element and the light converter in an alternative approach. The decoupling structure is preferably arranged such that essentially all light entering the cooling element in the direction from the light converter leaves the transparent cooling element at the opposite side. The cooling element may, for example, comprise a sheet of sapphire.

The cooling element is preferably bonded to the substrate by means of the reflective side structure.

The reflective side structure may comprise a matrix material which is transparent in the wavelength range of the laser light and the wavelength range of the converted light. The matrix material may comprise reflective particles dispersed in the matrix material, wherein the reflective particles are reflective in the wavelength range of the laser light and the wavelength range of the converted light. The matrix material comprising the reflective particles may be disposed on the side surface of the light converter. The cooling element may be bonded to the substrate by means of the matrix material.

The matrix material may be characterized by a means of a transmission of more than 99% in the wavelength ranges of the laser light and the converted light along the biggest extension of the reflective light structure. High transparency of the matrix material reduces absorption within the matrix material and thus corresponding heating. The matrix material may comprise silicone, glass or other suitable materials which can be used as side coating in order to provide a reflective side structure. The reflective particles may comprise, for example, metal oxide particles especially titanium oxide particles.

The transparent cooling element may comprise an antireflective coating for reducing its reflectivity for laser light and converted light. The antireflective coating is especially in case of a flat, sheet like transparent cooling element preferably provided on both sheet surfaces of the transparent cooling element, i.e., on the surface facing the light converter as well as on the opposite surface. The transparent cooling element may alternatively comprise a curved surface for e.g. focusing the converted light and the reflected laser light. The transparent cooling element may in this case comprise only one antireflective coating. The antireflective coating is arranged to avoid reflection of e.g. blue laser light which is used to irradiate the light converter and such that essentially all light emitted by the light converter (or to be more precise irradiating the transparent cooling element from the direction of the light converter) can enter and subsequently leave the transparent cooling element.

The cooling element may comprise a support structure. The support structure may be arranged to define a distance between the light entrance surface of the light converter and the cooling element perpendicular to the light entrance surface.

The support structure may be an integrated part of the cooling element or a part which can be separated. The support structure may comprise a different material than the rest of the cooling element. The support structure may be glued or bonded to the substrate and/or to the rest of the cooling element.

According to a further aspect a light emitting element is provided. The light emitting element comprises the light converting device as described above. The light emitting element further comprises an optical element. The optical element is mechanically coupled or adhered to the cooling element by means of a bonding layer. The bonding layer has a refractive index which is the same or greater than the refractive index of the decoupling structure. The decoupling structure comprises an air gap as described above or a decoupling material (e.g. silicone) arranged between the light converter and the cooling element which has the same or a lower refractive index than the glue or adhesive used for bonding the optical element.

According to a further aspect a laser-based light source is provided. The laser based light source comprises a light converting device or a light emitting device as described above and at least one laser which is adapted to emit the laser light.

The laser-based light source may comprise two, three, four or more lasers (e.g. the form of an array) emitting, for example, blue laser light.

According to a further aspect a vehicle headlight is provided. The vehicle headlight comprises at least one laser-based light source as described above. The vehicle headlight may comprise two, three, four or more laser-based light sources as described above. The light converter may in this case comprise or consist of a yellow phosphor garnet (e.g. $Y_{(3-0.4)}Gd_{0.4}Al_5O_{12}$:Ce). A mixture of blue laser light and yellow converted light may be used to generate white light. Around 21% of the blue laser light may be reflected, and the remaining blue laser light may be converted to yellow light. This enables a ratio of 26% blue laser light and 74% yellow converted light in the mixed light emitted by the laser-based light source by taking into account, for example, Stokes losses in the phosphor.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

Figure 1:
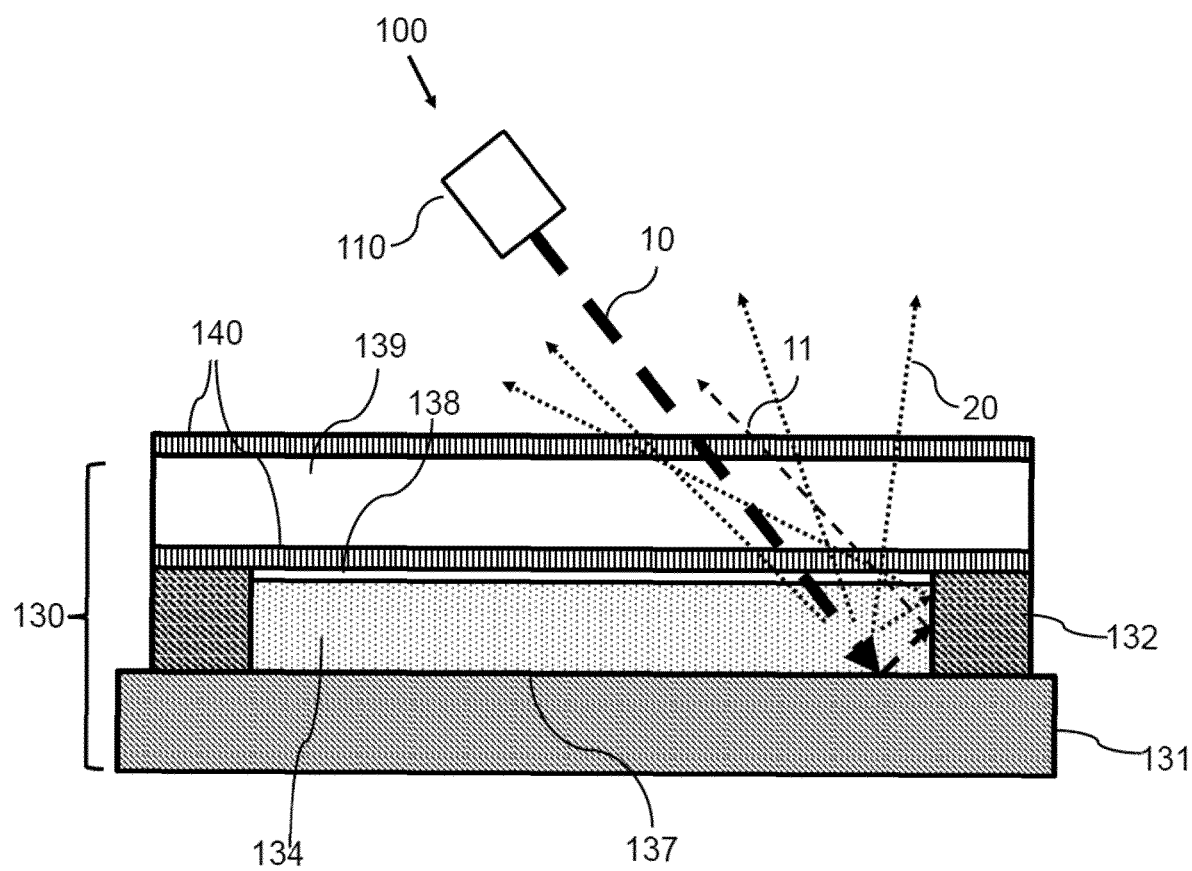
Figure 2:
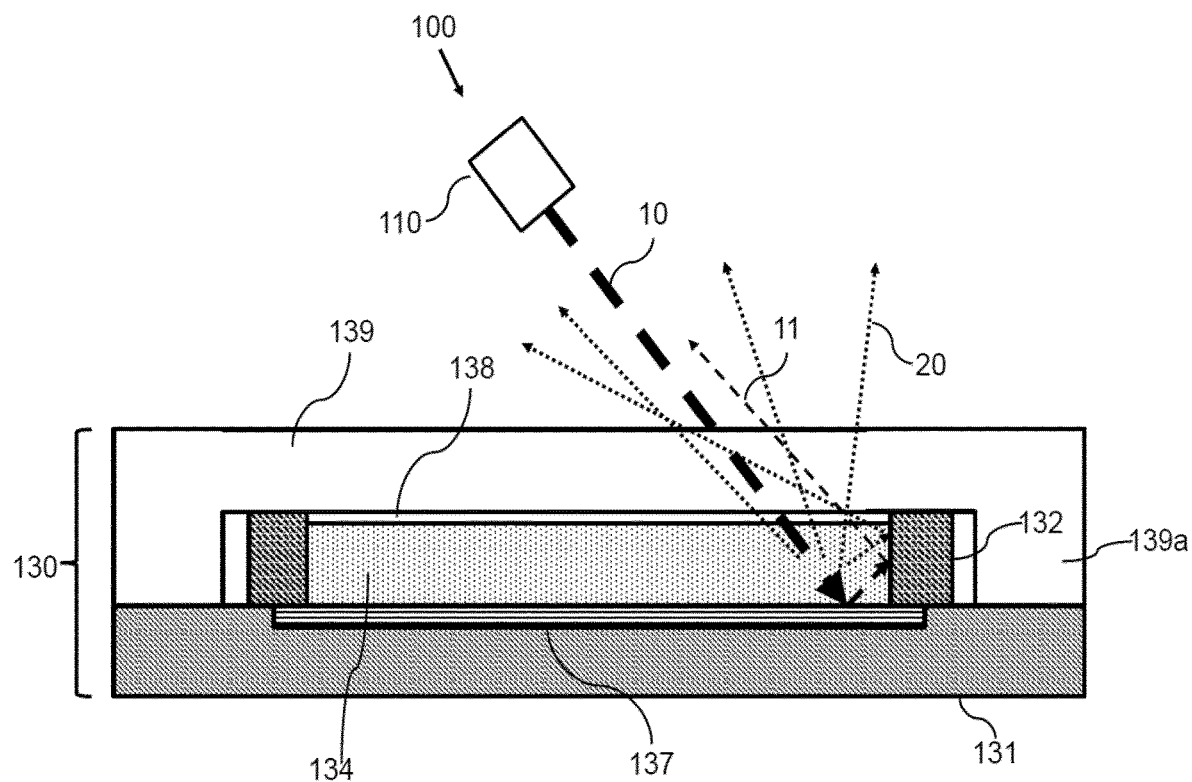
Figure 3:
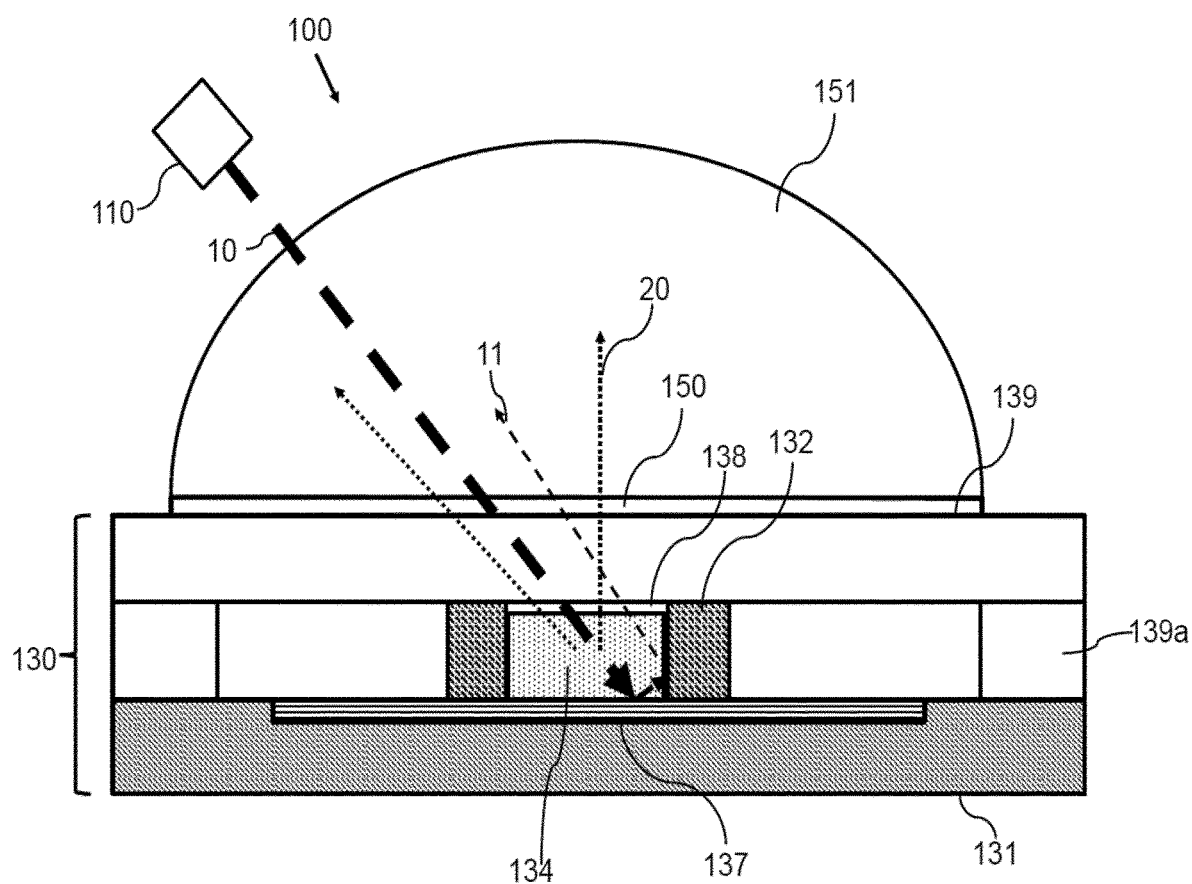

FIG. 1 shows a principal sketch of a first embodiment of a laser-based light source with a light converting device FIG. 2 shows a principal sketch of a second embodiment of a laser-based light source with a light converting device FIG. 3 shows a principal sketch of a third embodiment of a laser-based light source with a light converting device In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

FIG. 1 shows a principal sketch of a first embodiment of a laser-based light source 100 comprising a light converting device 130. A transparent cooling element 139 which comprises a sapphire plate is glued by means of the reflective side structure 132 to the substrate 131 which acts as a heatsink. The reflective side structure 132 covers the side surface or surfaces of the light converter 134 and comprises silicone which acts as glue for the transparent cooling element 139. The glue is "filled" with scattering particles, e.g. $TiO_x$, with a particle diameter ~100 nm up to a few μm. The glue is dispensed around the light converter 134 (phosphor) and is cured in place such that there is a decoupling structure 138 between the light converter 134 and the transparent cooling element 139. The decoupling structure 138 is in this case a gap which avoids optical guiding of light emitted by the light converter 134 within the transparent cooling element 139. A laser 110 is arranged to emit blue laser light 10 which enters the light converter 134 (yellow phosphor garnet) via the sapphire plate 139 which comprises an anti-reflective coating 140 avoiding reflection of light in the wavelength range of the laser light 10 and the converted light 20. A part of the blue laser light 10 is converted to yellow converted light 20. A mixture of reflected blue laser light 11, which has been reflected at a reflective structure 137 being a polished surface of the substrate 131, and converted light 20 is emitted via the sapphire plate 139. Thus, the laser-based light source 100 is arranged to emit white light which comprises such mixture of reflected laser light 11 and converted light 20. The size of the sapphire plate 139 is arranged such that a substantial part of the heat generated in or at the reflective side structure 132 is dissipated such that damage or degradation of the reflective side structure 132 is avoided.

FIG. 2 shows a principal sketch of a second embodiment of a laser-based light source 100 with a light converting device 130. The light converting device 130 comprises a substrate 131 which acts again as a heatsink. The substrate 131 further comprises a reflective structure 137 which is arranged between an e.g. heat conducting metal sheet comprised by the substrate 131 and the light converter 134. The reflective structure 137 is a combination of a multilayer dichroic filter being reflective in the wavelength range of the laser light 10 and the converted light 20 and a silver layer between the dichroic filter and the metal sheet. The light converter 134 is glued to the reflective structure 137. A reflective side structure 132 is deposited at the side surfaces of the light converter 134. The reflective side structure 132 bonds or adheres a transparent cooling element 139 either directly (direct bond between the cooling element 139 and the substrate 131) or indirectly (bonding via the light converter 134) to the substrate 131. The cooling element 139 comprises a support structure 139a. The support structure 139a is arranged to define a distance between the light entrance surface of the light converter 134 and the cooling element 139 perpendicular to the light entrance surface such that there is a decoupling structure 138 (air gap) between the light converter 134 and the cooling element 139. The laser 110 emits laser light 10 through the transparent cooling element 139 to the light converter 134. A part of the laser light 10 is converted by means of the light converter 134 to converted light 20 such that a mixture of reflected laser light 11 and converted light 20 is emitted through the transparent cooling element 139.

FIG. 3 shows a principal sketch of a third embodiment of a laser-based light source 100 with a light converting device 130. The light converting device 130 differs from the light converting device 130 described with respect to FIG. 2 in that the support structure 139a is a separate structure. The light converting device 130 is further combined with an optical element 151 in order to build a light emitting element. The optical element 151 which is, for example a sapphire dome is bonded to the cooling element 139 by means of a bonding layer 150. The bonding layer 150 may be a layer of glue or adhesive which is arranged between the cooling element 139 and the optical element 151. The decoupling structure 138 comprises a silicone material with a refractive index which is the same or smaller than the refractive index of the material of the bonding layer 150 such that essentially all of the converted light 20 and reflected laser light 11 received by the transparent cooling element 139 leaves the transparent cooling element 139 via the bonding layer 150 in order to be collimated by means of the optical element 151. The optical element 151 (sapphire dome) has a bigger diameter than the light converter 134 (e.g. 5 or even 10 times more) such that essentially all reflected laser light 11 and converted laser light 20 passes the sapphire dome. The laser light 10 emitted by the laser 110 passes the optical element 151 (sapphire dome), the bonding layer 150, the cooling element 139 and the decoupling structure 138 before entering the light converter 134.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 laser light
11 reflected laser light
20 converted light
100 laser-based light source
110 laser
130 light converting device
131 substrate
132 reflective side structure
134 light converter
137 reflective structure
138 decoupling structure
139 cooling element
139a support structure
140 antireflective coating
150 bonding layer
151 optical element

The invention claimed is:

1. A light converting device comprising:
a light converter adapted to convert laser light to converted light having a peak emission wavelength in a longer wavelength range than a laser peak emission wavelength of the laser light, the light converter comprising a light entrance surface, a bonding surface opposite to the light entrance surface and a side surface;
a substrate comprising a reflective structure to which the bonding surface is bonded, the light converter arranged on the substrate for reflecting laser light and converted light by means of the reflective structure;
a reflective side structure coating the side surface of the light converter for reflecting laser light and converted light by means of the reflective side structure;
a cooling element attached to the reflective side structure for cooling the reflective side structure, the cooling element comprising material which is transparent in the wavelength range of the laser light and the wavelength range of the converted light, the cooling element arranged in an optical path of the laser light, an optical path of reflected laser light and an optical path of the converted light, and
a decoupling structure arranged between the light converter and the cooling element, the decoupling structure arranged to avoid light guiding of the reflected laser light and the converted light in the cooling element.

2. The light converting device according to claim 1, wherein the decoupling structure comprises a surface roughness of at least one of the surfaces of the light converter and the cooling element facing each other such that less than 5% of these facing surfaces touch each other.

3. The light converting device according to claim 1, wherein the decoupling structure comprises an air gap or a decoupling material between the light converter and the cooling element, and a refractive index of the air gap or the decoupling material is the same or less than a refractive index of a material adjoining a surface of the cooling element opposite to a surface of the cooling element facing the light converter.

4. The light converting device according to claim 1, wherein the reflective side structure comprises a matrix material which is transparent in the wavelength range of the laser light and the wavelength range of the converted light, wherein the matrix material comprises reflective particles dispersed in the matrix material, wherein the reflective particles are reflective in the wavelength range of the laser light and the wavelength of the converted light, wherein the matrix material is disposed on the side surface of the light converter, and wherein the cooling element is bonded to the substrate by means of the matrix material.

5. The light converting device according to claim 4, wherein the matrix material comprises a silicone material and wherein the reflective particles comprise titanium oxide.

6. The light converting device according to claim 1, wherein the cooling element comprises a sheet of sapphire.

7. The light converting device according to claim 1, wherein the cooling element comprises an antireflective coating for reducing its reflectivity for the laser light and the converted light.

8. The light converting device according to claim 1, wherein the cooling element comprises a support structure, wherein the support structure is arranged to define a distance between the light entrance surface of the light converter and the cooling element perpendicular to the light entrance surface.

9. A light emitting element comprising the light converting device according to claim 3, the light emitting element further comprising an optical element, wherein the optical element is mechanically coupled to the cooling element by means of a bonding layer, wherein the bonding layer has a refractive index which is the same or greater than the refractive index of the air gap or the decoupling element.

10. A laser-based light source, comprising:
   the light converting device according to claim 1, and
   a laser, wherein the laser is adapted to emit the laser light.

11. A vehicle headlight, comprising at least one laser-based light source according to claim 10.

12. A laser-based light source, comprising:
   the light emitting element according to claim 9, and
   a laser, wherein the laser is adapted to emit the laser light.

13. A vehicle headlight comprising at least one laser-based light source according to claim 12.

* * * * *